United States Patent
Hsieh

(10) Patent No.: US 6,510,248 B1
(45) Date of Patent: Jan. 21, 2003

(54) RUN-LENGTH DECODER WITH ERROR CONCEALMENT CAPABILITY

(75) Inventor: Tsung-Hsien Hsieh, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/476,430

(22) Filed: Dec. 30, 1999

(51) Int. Cl.$^7$ ............................. G06K 9/36; G06K 9/46
(52) U.S. Cl. ......................... 382/233; 382/245; 341/59
(58) Field of Search .............................. 382/233, 245, 382/218; 341/59, 63, 81, 94, 102, 103; 358/426.13; 375/240.25, 240.27; 348/425.2

(56) References Cited

U.S. PATENT DOCUMENTS

| | | | | |
|---|---|---|---|---|
| 3,927,251 A | * | 12/1975 | White et al. ............ | 358/426.02 |
| 4,334,246 A | * | 6/1982 | Saran ..................... | 358/426.12 |
| 6,205,251 B1 | * | 3/2001 | Hsieh et al. ............. | 382/233 |

* cited by examiner

Primary Examiner—Phuoc Tran
(74) Attorney, Agent, or Firm—W. Wayne Liauh

(57) ABSTRACT

A run-length based decoder for decoding compressed image data while allowing error to be contained with the length of a code word. The decoder includes: (a) a shifter for outputting Q+1 number of N-bit data streams; (b) Q+1 code comparators to respectively receive the data streams from the shifter; (c) a code type arbitrator which includes a multiplexer to receive output signals from the Q+1 number of code comparators, and output the data stream received from the code word comparator which also outputs the verification signal; (d) a shift number generator connected to the code arbitrator to receive the N-bit data stream from the code arbitrator and generate a new_shift_number to the shifter according to the number of bits associated with the code word pattern of the N-bit data stream; and (e) a code interpreter which is also connected to the code arbitrator to receive to decode the N-bit data stream into pixels. The Q+1 number of comparators include (i) a comparator which does not make any assumption of the data stream, and (ii) Q number of comparators each assuming a respective code word pattern for the data stream and compares it with a predetermined code word table to see whether the data stream conforms to the assumed code word pattern. If yes, then the comparator outputs a verification signal along with the data stream which has been reset to conform to the assumed code word pattern.

14 Claims, 1 Drawing Sheet

Block Diagram of the New Run-Length Decoder

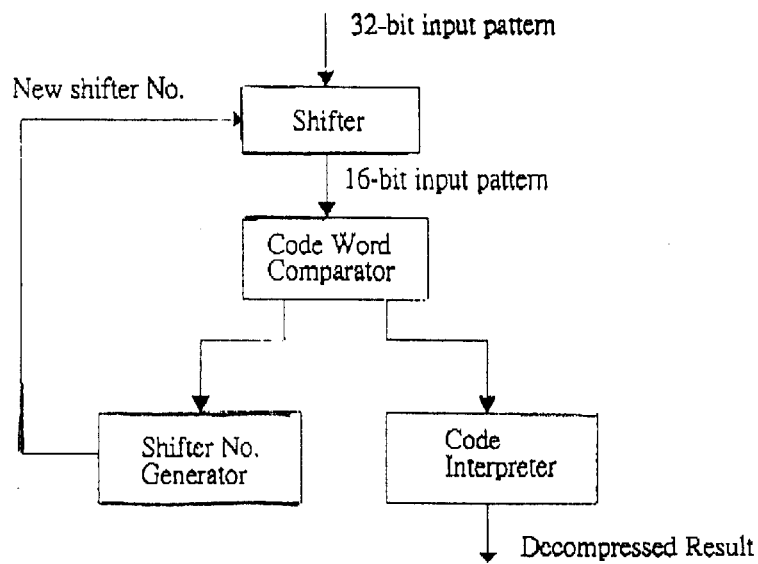
Figure 1. Functional Block Diagram of Run-Length Decoder
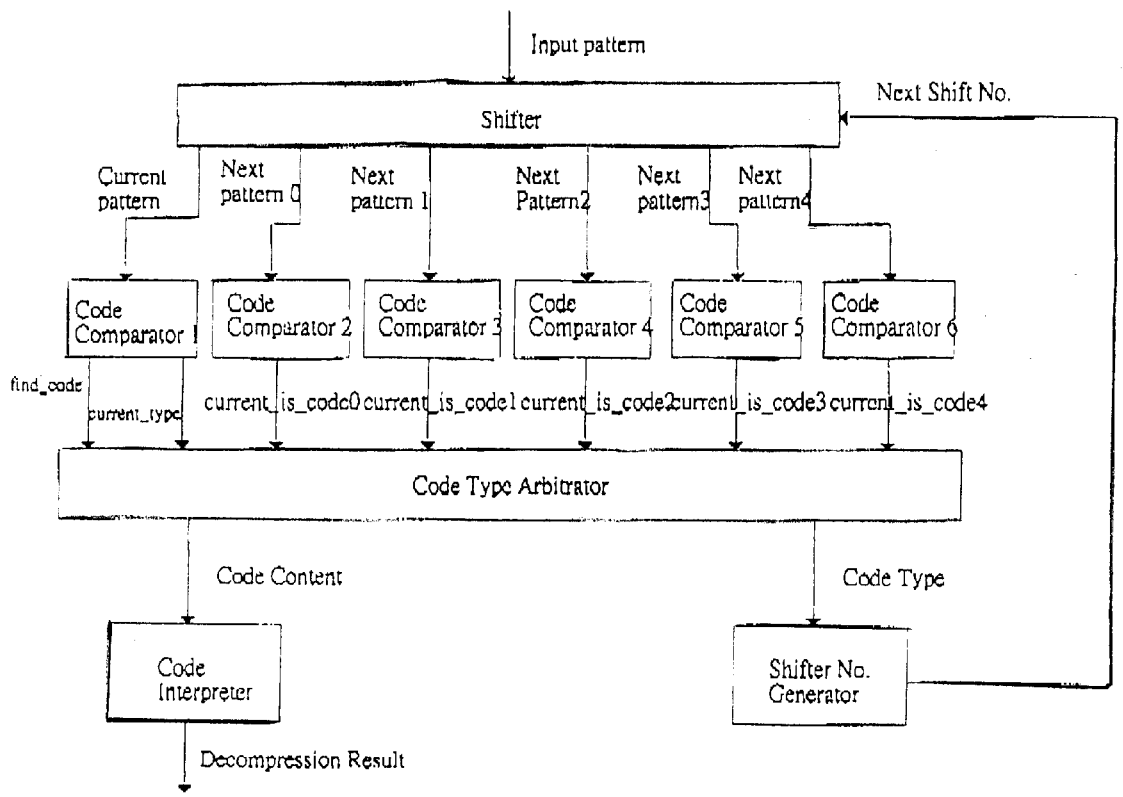
Figure 2 Block Diagram of the New Run-Length Decoder

RUN-LENGTH DECODER WITH ERROR CONCEALMENT CAPABILITY

FIELD OF THE INVENTION

The present invention relates to an improved apparatus and method, for real-time decoding, or decompressing, a sequence of compressed words which are structured to have non-uniform lengths. More specifically, the present invention relates to a so-called run-length decoder with an improved structure, so as to effectively contain a corrupted code word within its own length and thus keeping it from further propagation during the real-time decoding process. The method disclosed in the present invention is most advantageous for decompressing multimedia data, which are typically vast in size but have become an important everyday item in today's digital age. Another advantage of the present invention is that the error containment is achieved during the decoding process without requiring major additional computational efforts, and thus can be implemented with low-end machines in a very cost-effective manner.

BACKGROUND OF THE INVENTION

Multimedia, or image, data such as those used in CD, DVD, MP3, and eventually digital TV, have become increasingly popular in today's computer and communication systems. Because of the vast amount of data involved, which create a very heavy burden to the memory storage space and/or the transmission bandwidth, data compression is typically required so as to reduce the memory storage and/or bandwidth requirement. As a result, multimedia data are typically compressed before they are stored in the memory or transferred into the communication channel. These compressed data must be de-compressed, or decoded, before they can be put is use. In order to achieve real-time or near-real-time decoding, the decoding algorithm must be relatively simple, and must be done on a sequential basis. Batch programs such as MPEG, JPEG, etc. require relatively large buffer space, and may not be adaptable for a wide variety of machines.

In order to maximize the data compression efficiency, the compressed codes typically do not have a uniform length. This can cause problems in that if one coded (compressed) word is corrupted due to noise in the storage media or communication channel, the decoding of the entire data can be affected rendering it useless. One of the ways to ameliorate this problem is to implement a line-based compression rule, which compresses the image data on a line-by-line basis, and inserts a line_end_code at the end of each line of codes. Thus, if a code is corrupted, it will be contained in the line containing the same. The entire line will be ignored, but the rest of the image data is designed to remain unaffected.

One of the most frequently used line-based compression methods is called run-length compression method. Basically with this method the compressed code comprises three portions: (1) the range of number of pixels (or bits) having the same value; (2) the exact number of the pixels contained in the un-compressed code; (3) the pixel data. Both portions (1) and (2) are of variable lengths. Portion (1), which also provides information regarding the total length of the code word, typically contains an even number of zeros, and Portion (2) contains the exact number of bits required to represent the number of pixels within the range indicated in Portion (1) which have the same value. Portion (1) can be omitted if the number of same value pixels is very small (typically from 1 to 3). An example of the run-length compression method is described below. This example is based on a maximum 16-bit compressed code, which is also the length of the data stream being processed by the decoder.

(A) The Compressed Code Represents 1 to 3 Pixels with the Same Pixel Value (Code Word 0)

These pixels are represented by the following code word:

| bit position | d0 d1 | d2 d3 |
|---|---|---|
| content | # of total pixels | pixel data |

(B) The Compressed Code Represents 4 to 15 Pixels with the Same Pixel Value (Code Word 1)

These pixels are represented by the following code word:

| bit position | d0 | d1 | d2 | d3 | d4 | d5 | d6 | d7 |
|---|---|---|---|---|---|---|---|---|
| content | 0 | 0 | # of total pixels | | | | pixel data | |

(C) The Compressed Code Represents 16 to 63 Pixels with the Same Pixel Value (Code Word 2)

These pixels are represented by the following code word:

| bit position | d0 | d1 | d2 | d3 | d4 | d5 | d6 | d7 | d8 | d9 | d10 | d11 |
|---|---|---|---|---|---|---|---|---|---|---|---|---|
| content | 0 | 0 | 0 | 0 | # of total pixels | | | | | | pixel data | |

(D) The Compressed Code Represents 64 to 255 Pixels with the Same Pixel Value (Code Word 3)

These pixels are represented by the following code word:

| bit position | d0 | d1 | d2 | d3 | d4 | d5 | d6 | d7 | d8 | d9 | d10 | d11 | d12 | d13 | d14 | d15 |
|---|---|---|---|---|---|---|---|---|---|---|---|---|---|---|---|---|
| content | 0 | 0 | 0 | 0 | 0 | 0 | | | # of total pixels | | | | | | pixel data | |

(E) The Compressed Code Represents Same Pixels to the End of Line (Code Word 4)
These pixels are represented by the following code word:

| bit position | d0 | d1 | d2 | d3 | d4 | d5 | d6 | d7 | d8 | d9 | d10 | d11 | d12 | d13 | d14 | d15 |
|---|---|---|---|---|---|---|---|---|---|---|---|---|---|---|---|---|
| content | 0 | 0 | 0 | 0 | 0 | 0 | 0 | 0 | 0 | 0 | 0 | 0 | 0 | 0 | pixel data | |

Code Word 4 is also considered as the line_end-code.

If the byte alignment is not accomplished when the description of pixels on one line is completed, a dummy data of 4 bits 0000b is inserted for adjustment.

When the image data are coded according to the above-mentioned example, the decoder typically comprises a shifter, a code word comparator, a shift_number generator, and a code interpreter. Because this method implements a 16-bit decoding operation, the shifter requests and receives 16-bit data stream from a data bus, typically a 32-bit data bus. The code word comparator checks the number of leading even-numbered zeros in the first portion of the code word to determine the number of bits in the second portion, i.e., after the leading zeros in the first portion. Since the bit number in the third portion is fixed, i.e., always two bits, the total number of bits in the code word being compared in the comparator can be determined. The comparator then sends the bit count data to the shift_number generator, which sends a new_shift_number (which is the same as the bit count of the code word being compared) to the shifter. The shifter then shifts the data stream stored therein according the new_shift_number, and a new 16-bit data stream is sent to the code word comparator from the shifter. The shifter also sends a request for a new 32-bit image data when the data stored therein is about to be exhausted due to the bit shifting.

The length of each code word according to the run-length method is not fixed. Different repeat pixel patterns will result in different lengths of the resulting code words. Each line is terminated with a line_end_code, this compression rule is line-based, i.e., it compresses the image date on a line by line basis. Due to noise that may be present in the storage medium or communication channel, the code word may be corrupted. If the corruption occurs in the first portion, i.e., the portion which contains leading zeros to determine the length of the code word, not only this particular code word will not be interpreted correctly, all the image data that follow will also be affected.

SUMMARY OF THE INVENTION

The primary object of the present invention is to develop an improved decoding method and device to decompress image data that have been compressed according to the run-length technique. More specifically, the primary object of the present invention is to develop an improved run-length based decoding method which will prevent the propagation of a corrupted code word into the rest of the image data by containing the error within the length of the code.

According to the run-length compression method an image data is compressed by grouping pixels with the same value into a compressed code word. Each compressed code word comprises three portions:

(1) 0 to N-m bits to indicate the number of bits corresponding to the range of the number of pixels having the same value (in the uncompressed image data), where N is the number of bits of the data stream being decoded and m is the number of bits taken up by the pixel data. The range of the number of repeat pixels, as represented by the bit number of portion (1) also tells the number of bits reserved for Portion (2), which is dictated by the maximum possible number of repeat pixels within the range indicated by Portion (1).

(2) The exact number of the (repeat) pixels contained in the un-compressed code, if portion (1) takes up N-m bits, then no space is reserved for Portion (2).

(3) The pixel data, m bits, typically 2 bits.

Portion (1) typically contains an even number of zeros, and Portion (2) contains the number of bits required to represent the maximum number of repeat pixels within the range indicated in Portion (1). Both portions (1) and (2) are of variable lengths. The value represented in Portion (2), of course, is a variable, depending on the exact number of repeat pixels. According to an embodiment of the run-length method, portion (1) can be omitted if the number of same value pixels is very small. If portion (1) takes up N-m bits, then the code word means the same pixels continue until the end of each line.

In one of the preferred embodiment of the present invention, the maximum number of bits for a code word is 16 bits (i.e., the entire length of the data stream), and the compressed code word is represented by one of five code patterns, containing 0 (exactly 1 to 3 repeating pixels), 2 (4 to 15 repeating pixels), 4 (16 to 63 repeating pixels), 6 (64 to 255 repeating pixels), and 14 (repeating pixels to the end of line) leading zeros, respectively. During the decoding process, the shifter of the present invention has six outputs, each going into one of six code comparators. These six comparators of the present invention are structured as follows:

Code Comparator 1: In this comparator, no assumption is made to the code word pattern, the number of bits in the first portion is established by reading leading zeros, then the number of same pixels is establish from the second portion. If the latter agrees with the first, then the code word is not corrupted, and an output signal find_code is turned active.

Code Comparator 2: In this comparator, it assumes that there are no leading zeros (i.e., assuming 1 to 3 same pixels) in the first portion, and it checks the first two bits to verify if the number of same pixels matches this assumption. If the assumption is valid then an output signal current_is_code0 is made active, along with the Code Word 0 type code word.

Code Comparator 3: In this comparator, it assumes that there two leading zero (i.e., assuming 4 to 15 same pixels) in the first portion of the code word and resets the corresponding bits accordingly (i.e., resetting the first two bits to zero). Then it checks values in the next four bits to verify if the number of same pixels so represented matches this assumption. If the assumption is valid then an output signal current_is_code1 is made active, along with the reset code word (Code Word 1).

Code Comparator 4: In this comparator, it assumes that there four leading zero (i.e., assuming 16 to 63 same pixels) in the first portion of the code word and resets the corresponding bits accordingly (i.e., resetting the first four bits to zero). Then it checks values in the next six bits to verify if the number of same pixels so represented matches this assumption. If the assumption is valid then an output signal current_is_code2 is made active, along with the reset code word (Code Word 2).

Code Comparator 5: In this comparator, it assumes that there six leading zero (i.e., assuming 64 to 255 same pixels) in the first portion of the code word and resets the corresponding bits accordingly (i.e., resetting the first six bits to zero). Then it checks values in the next eight bits to verify if the number of same pixels so represented matches this assumption. If the assumption is valid then an output signal current_is_code3 is made active, along with the reset code word (Code Word 3).

Code Comparator 6: In this comparator, it assumes that there fourteen leading zero (i.e., assuming same pixels all the way to the end of line) in the first portion and resets the corresponding bits accordingly (i.e., resetting the first fourteen bits to zero). This is a default, or catch-all, option, no comparison needs to be made. This assumption is valid if none of the other code comparators sends out an active output signal, and an output signal current_is_code4 is made active, along with the reset code word (Code Word 4).

Output signals from the six code comparators are sent to a Code Type Arbitrator, which is essentially a multiplexer, a properly reset code word is then selected along with the number of bits it should have taken up. The reset code word is sent to a Code Interpreter, and the number of bits is read by a Shift_Number_Generater, which subsequently sends aNew_Shift_Number to the shifter, and a new 16-bit input is output from the shifter to all of the six Code Word Comparators.

Alternatively, the resetting of the data stream to correspond to each of the assumed Code_Word_Patterns can be done in the shifter.

With the method disclosed in the present invention, if a code word is corrupted, the main objective is not to try to determine what the correct code may be. Rather, the main objective is to determine its correct word length, so that the error will be contained within that length, and will not be propagated and thus affecting the rest of the data. Another advantage of the present invention is that the error containment is achieved during the decoding process without requiring major additional computational efforts, and thus can be implemented in a very cost-effective manner. For example, the entire operation can be pipe-lined so that the operation which involves a plurality of comparators will not result in increased computation cycles.

BRIEF DESCRIPTION OF THE DRAWING

The present invention will be described in detail with reference to the drawing showing the preferred embodiment of the present invention, wherein:

FIG. 1 is a flowchart showing a conventional decoding scheme for a code word that has been compressed according to the run-length technique.

FIG. 2 is a flowchart of the decoding scheme according to a preferred embodiment of the present invention for decompressing a code word that has been compressed according to the run-length technique.

DETAILED DESCRIPTION OF THE PREFERRED EMBODIMENT

The present invention discloses an improved decoding method and device to decompress image data that have been compressed according to the run-length technique. The improved run-length based decoding method of the present invention allows the error, which can occur due to noise in the storage medium or communication channel, to be contained within the length of the code word, and prevents it from propagating into the rest of the image data.

FIG. 1 is a flowchart showing a conventional decoding scheme for a code word that has been compressed according to the run-length technique. Data stream, typically in a 32-bit input pattern, enters and is stored in a shifter 1, from which a 16-bit data stream, which contains a code word of flexible length but maximum 16 bit, is output and sent to a code word comparator 2. The code word comparator 2 determines the total number of bits in the code word contained in the 16-bit data stream and sends it as the New_Shift_Number to the shifter 1. The shifter 1 shifts the data stream by a amount according to the New_Shift_Number. A new 16-bit data stream, is output and sent to a code word comparator 2. If the data stream in the shifter 1 is about to be exhausted, the shifter 1 sends a request for a new 32-bit data stream. Because the code word does not have a fixed length, if the code word, especially the portion determining the number of bits associated with the code word, is corrupted, not only the code word will not be interpreted corrected, the error will propagate into subsequent portions of the image data.

According to the run-length compression method, an image data is compressed by grouping pixels with the same value into a compressed code word. Each compressed code word comprises three portions: (1) the first portion which contains 0 to N-m bits to indicate the number of bits, p, reserved in the next portion, where N is the number of bits of the data stream that is being decoded by the decoder and m is the number of bits taken up by the pixel data; (2) the second portion contains p bits the value of which corresponds to the number of pixels having the same value as represented by the code word, if portion (1) takes up N-m bits, then no space is reserved for portion (2); and (3) the third portion which contains m bits (typically 2 bits) representing the (uncompressed) pixel data.

In other words, a run-length decoding scheme utilizes a flexible length but maximum N-bit code word according to a predetermined set of patterns from Code_Word_Pattern 0 to Code_Word_Pattern Q, each represents a predetermined code word length (i.e., in the compressed form), wherein:

(1) Code_Word_Pattern 0 contains no leading zeros;

(2) Code_Word_Pattern Q, which is the line_end_code, contains N-m leading zeros, where m is the number of bits to represent pixel data;

(3) Code_Word_Patterns q, where q ranges from 1 to (Q−1), each Code_Word_Patterns q contains two time q (2×q) number of leading zeros, to indicate 2×(q+1) bits reserved for said second portion of said code word and represent from $(2^{q+1})$ to $(2^{q-3}-1)$ of repeated pixels.

The unique number of leading zeros in each Code_Word_Pattern determines the length of the Code_Word_Pattern. If this portion is corrupted, not only this particular code will not be decoded correctly, because the coding scheme utilizes flexible code word length, the rest of the image data will also be corrupted.

In the present invention, the shifter is structured to additionally send out Q outputs to Code_Word_Comparators 1 through Q, respectively. Each of the additional Q Code_Word_Comparators either assumes the data stream as according to pre-designated pattern (i.e., Code_Word_

Comparator 1 assumes the code word corresponds to Code_Word_Pattern 1, Code_Word_Comparator q assumes the code word corresponds to Code_Word_Pattern q, etc.), or resetting it to fit it to that pre-designated pattern by supplying the leading zeros accordingly (i.e., Code_Word_Comparator 1 resets the first two bits of the input code word to zero, Code_Word_Comparator q resets the first 2×q bits of the input code word to zero, etc.) Then each of the Code_Word_Comparators compares the value in the second portion (the bit number of the second portion is determined by the number of leading pairs of zeros) with the Code_Word_Pattern so assumed. If there is a match, then a corresponding Current_Code_Is is turned active. The code word will be decoded according to the Code_Word_Pattern so determined, and the number of bits, also so determined, will be sent to the sifter as input for New_Shift_Number.

Alternatively, the resetting of the data stream to correspond to each of the assumed Code_Word_Patterns can be done in the shifter.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

In this example the code word is 16-bit compressed code which is coded according to one of the five code word patterns, Code_Word_Pattern 0 through Code_Word_Pattern 4.

(A) The Compressed Code Represents 1 to 3 Pixels with the Same Pixel Value (Code Word Pattern 0)

These pixels are represented by the following code word:

| bit position | d0 | d1 | d2 | d3 |
|---|---|---|---|---|
| content | # of total pixels | | pixel data | |

(B) The Compressed Code Represents 4 to 15 Pixels with the Same Pixel Value (Code Word Pattern 1)

These pixels are represented by the following code word:

| bit position | d0 | d1 | d2 | d3 | d4 | d5 | d6 | d7 |
|---|---|---|---|---|---|---|---|---|
| content | 0 | 0 | # of total pixels | | | | pixel data | |

(C) The Compressed Code Represents 16 to 63 Pixels with the Same Pixel Value (Code Word Pattern 2)

These pixels are represented by the following code word:

| bit position | d0 | d1 | d2 | d3 | d4 | d5 | d6 | d7 | d8 | d9 | d10 | d11 |
|---|---|---|---|---|---|---|---|---|---|---|---|---|
| content | 0 | 0 | 0 | 0 | # of total pixels | | | | | | pixel data | |

(D) The Compressed Code Represents 64 to 255 Pixels with the Same Pixel Value (Code Word Pattern 3)

These pixels are represented by the following code word:

| bit position | d0 | d1 | d2 | d3 | d4 | d5 | d6 | d7 | d8 | d9 | d10 | d11 | d12 | d13 | d14 | d15 |
|---|---|---|---|---|---|---|---|---|---|---|---|---|---|---|---|---|
| content | 0 | 0 | 0 | 0 | 0 | 0 | | | # of total pixels | | | | | | pixel data | |

(E) The Compressed Code Represents Same Pixels to the End of Line (Code Word Pattern 4)

These pixels are represented by the following code word:

| bit position | d0 | d1 | d2 | d3 | d4 | d5 | d6 | d7 | d8 | d9 | d10 | d11 | d12 | d13 | d14 | d15 |
|---|---|---|---|---|---|---|---|---|---|---|---|---|---|---|---|---|
| content | 0 | 0 | 0 | 0 | 0 | 0 | 0 | 0 | 0 | 0 | 0 | 0 | 0 | 0 | 0 | pixel data |

Code_Word_Pattern 4 is also considered as the line_end-code.

FIG. 2 is a flowchart of the decoding device 10 according to a preferred embodiment of the present invention for decompressing a code word that has been compressed according to the run-length technique. Unlike the conventional method, in the present invention, the shifter 11 outputs an unmodified 16-bit data stream (unmodified code word), plus five additional modified data streams The five modified data streams are provided by resetting their appropriate bits to zeros so that they conform to Code_Word_Patterns 0 through 4, respectively. The six data streams are sent to Code_Word_Comparators 1 through 6, respectively. The six Code_Word_Comparators are structures as follows:

Code_Word_Comparator 1 receives the unmodified data stream as it input, if the unmodified data stream can be found in the code table (i.e., it can be recognized), then an output signal find_code is active.

Code_Word_Comparator 2 receives a data stream modified according to Code_Word_Pattern 0 as it input, if the modified data stream can be found in the code table (i.e., it can be recognized), then an output signal Code_Word_Pattern_0 is active. Since Code_Word_Comparator 2 does not reset any of the bits of the code word to zero, it can be omitted.

Code_Word_Comparator 3 receives a data stream modified according to Code_Word_Pattern 1 as it input (i.e., the first two bits of the original data stream is forced to be zero), if the modified data stream can be found in the code table (i.e., it can be recognized), then an output signal Code_Word_Pattern_1 is active.

Code_Word_Comparator 4 receives a data stream modified according to Code_Word_Pattern 2 as it input (i.e., the first four bits of the original data stream is forced to be zero), if the modified data stream can be found in the code table (i.e., it can be recognized), then an output signal Code_Word_Pattern_2 is active.

Code_Word_Comparator 5 receives a data stream modified according to Code_Word_Pattern 3 as it input (i.e., the first six bits of the original data stream is forced to be zero), if the modified data stream can be found in the code table (i.e., it can be recognized), then an output signal Code_Word_Pattern_3 is active.

Code_Word_Comparator 6 receives a data stream modified according to Code_Word_Pattern 4 as it input, if the modified data stream can be found in the code table (i.e., it can be recognized), then an output signal Code_Word_Pattern 4 is active. Code_Word_Comparator 6 can also be set as a default Code Word Comparator, in that if none of the output from the other Code Word Comparators is active, it will be made active.

All the output signals are sent to a code type arbitrator 15, which is essentially a multiplexer. The unmodified and a specifically modified (or assumed) code word will be selected as the output if the corresponding Code_Word_Pattern is active. The bit number corresponding to the selected code word will be sent to the shifter as the New_Shift_Number, and the code word will be interpreted in the code interpreter 16.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A decoding device for decompressing code words that have been compressed according to a run-length method, by which repeated pixels of an image data are presented by one of a plurality of code word patterns, from code word pattern 1 through code word pattern Q, each code word pattern comprises: (i) a first portion which contains 0 to N-m bits to indicate the number of bits reserved in a second portion, where N is number of bits if a data stream being decoded and m is the number of bits taken up by a pixel data; (ii) a second portion contains a plurality of bits the value of which corresponds to the number of repeated pixels as represented by the code word, if the first portion takes up N-m bits, then no space is reserved for the second portion; and (iii) a third portion which contains m bits representing the pixel data; said decoding device comprises:

(a) a shifter for receiving and shifting an input data stream according to a new_shift_number and outputting Q+1 number of N-bit data streams, said N-bit data streams include an unmodified data stream and Q number of modified data streams each according to a respective code word pattern, said new_shift_number is initialized at zero;

(b) Q+1 number of code comparators to respectively receive said Q+1 number of N-bit data streams, wherein each of said code comparators compares a respective input N-bit data stream with a predetermined code word table to see whether said N-bit data stream conforms to a code word pattern, if yes, then output a verification signal along with said input N-bit data stream;

(c) a code type arbitrator which comprises a multiplexer to receive output signals from said Q+1 number of code comparators, and output the N-bit data stream received from the code word comparator which also outputs said verification signal;

(d) a shift number generator connected to said code arbitrator to receive said N-bit data stream from said code arbitrator and generate a new_shift_number to said shifter according to the number of bits associated with the code word pattern of said N-bit data stream; and (e) a code interpreter also connected to said code arbitrator to receive to decode said N-bit data stream into pixels.

2. The decoding device according to claim 1 wherein said code word patterns are defined as follows:

(a) Code_Word_Pattern 0, which contains no leading zeros to indicate 1 to 3 repeating pixels;

(b) Code_Word_Pattern Q, which is the line_end_code, contains N-m leading zeros;

(c) Code_Word_Patterns q, where q ranges from 1 to (Q−1), each Code_Word_Pattern q contains (2×q) number of leading zeros, to indicate 2×(q+1) bits reserved for said second portion of said code word and represent from $(2^{q+1})$ to $(2^{q+3}-1)$ of repeated pixels.

3. The decoding device according to claim 2 which contains Q−1 code comparators and each of said Q−1 code comparators operates by forcing the first q bits of said data stream to zero, where q ranges from 1 to (Q−1).

4. The decoding device according to claim 1 wherein said N-bit data stream is 16-bit data stream.

5. The decoding device according to claim 1 wherein said shifter is structured to received a 32-bit input data stream.

6. The decoding device according to claim 1 wherein said N-bit data stream is 16-bit data and the run-length compression method utilizes five code word patterns and said decoding device includes five code word comparators.

7. The decoding device according to claim 6 which contains the following five code word comparators:

(a) first code comparator, wherein no resetting is to take place;

(b) second code comparator, which resets the first two bits of the data stream to zero;

(c) third code comparator, which resets the first four bits of the data stream to zero;

(d) fourth code comparator, which resets the first six bits of the data stream to zero; and (e) second code comparator, which resets the first fourteen bits of the data stream to zero.

8. A decoding device for decompressing code words that have been compressed according to a run-length method, by which repeated pixels of an image data are presented by one of a plurality of code word patterns, from code word pattern 1 through code word pattern Q, each code word pattern comprises: (i) a first portion which contains 0 to N-m bits to indicate the number of bits reserved in a second portion, where N is number of bits if a data stream being decoded and m is the number of bits taken up by a pixel data; (ii) a second portion contains a plurality of bits the value of which corresponds to the number of repeated pixels as represented by the code word, if the first portion takes up N-m bits, then no space is reserved for the second portion; and (iii) a third portion which contains m bits representing the pixel data; said decoding device comprises:

(a) a shifter for receiving and shifting an input data stream according to a new_shift_number and outputting Q+1 number of identical N-bit data streams, said new_shift_number is initialized at zero;

(b) Q+1 number of code comparators to respectively receive said Q+1 number of N-bit data streams, wherein said Q+1 number of comparators include a comparator which does not make any assumption of said N-bit data stream, and Q number of comparators each assumes a respective code word pattern for the N-bit data stream that said comparator receives from said shifter and compares said N-bit data stream with a predetermined code word table to see whether said N-bit data stream conforms to said assumed code word pattern, if yes, then output a verification signal along with said input N-bit data stream which has been reset to conform to said assumed code word pattern;

(c) a code type arbitrator which comprises a multiplexer to receive output signals from said Q+1 number of code comparators, and output the N-bit data stream received from the code word comparator which also outputs said verification signal;

(d) a shift number generator connected to said code arbitrator to receive said N-bit data stream from said code arbitrator and generate a new_shift_number to said shifter according to the number of bits associated with the code word pattern of said N-bit data stream; and (e) a code interpreter also connected to said code arbitrator to receive to decode said N-bit data stream into pixels.

9. The decoding device according to claim 8 wherein said code word patterns are defined as follows:

(a) Code_Word_Pattern 0, which contains no leading zeros to indicate 1 to 3 repeating pixels;

(b) Code_Word_Pattern Q, which is the line_end_code, contains N-m leading zeros;

(c) Code_Word_Patterns q, where q ranges from 1 to (Q-1), each Code_Word_Pattern q contains (2×q) number of leading zeros, to indicate 2×(q+1) bits reserved for said second portion of said code word and represent from $(2^{q+1})$ to $(2^{q+3}-1)$ of repeated pixels.

10. The decoding device according to claim 9 which contains Q-1 code comparators and each of said Q-1 code comparators operates by forcing the first q bits of said data stream to zero, where q ranges from 1 to (Q-1).

11. The decoding device according to claim 8 wherein said N-bit data stream is 16-bit data stream.

12. The decoding device according to claim 8 wherein said shifter is structured to received a 32-bit input data stream.

13. The decoding device according to claim 8 wherein said N-bit data stream is 16-bit data the run-length compression method utilizes five code word patterns and said decoding device includes six code word comparators.

14. The decoding device according to claim 8 which contains the following five code word comparators:

(a) first code comparator, wherein no resetting is to take place;

(b) second code comparator, which resets the first two bits of the data stream to zero;

(c) third code comparator, which resets the first four bits of the data stream to zero;

(d) fourth code comparator, which resets the first six bits of the data stream to zero; and (e) second code comparator, which resets the first fourteen bits of the data stream to zero.

* * * * *